United States Patent
Harvey

[11] 3,759,614
[45] Sept. 18, 1973

[54] DUAL PHOTOCELL RANGE FINDER APPARATUS

[75] Inventor: Donald M. Harvey, Rochester, N.Y.

[73] Assignee: Eastman Kodak Company, Rochester, N.Y.

[22] Filed: Feb. 10, 1971

[21] Appl. No.: 114,279

[52] U.S. Cl............................ 356/4, 356/1, 95/44 C
[51] Int. Cl.............................................. G01c 3/08
[58] Field of Search......................... 95/44 C; 356/4; 250/201, 204

[56] References Cited
UNITED STATES PATENTS

| | | | |
|---|---|---|---|
| 3,652,160 | 3/1972 | Odone et al. ......................... | 95/44 C |
| 3,454,772 | 7/1969 | Vitt, Jr. et al. ...................... | 250/204 |
| 3,562,785 | 2/1971 | Craig .................................. | 250/204 |

Primary Examiner—Benjamin A. Borchelt
Assistant Examiner—S. C. Buczinski
Attorney—W. H. J. Kline and Raymond L. Owens

[57] ABSTRACT

An automatic range finder apparatus is disclosed which includes two spaced photosensitive devices, having electrical parameters which vary respectively as a function of the brightness of light incident thereon, and circuitry coupled to the devices for producing a signal which varies in accordance with changes in the magnitude of the parameters of the first and second photosensitive devices, the signal having a first predetermined magnitude when the magnitudes of the parameters of the devices are substantially equal and a second predetermined magnitude when the parameters are at predetermined relative magnitudes. The apparatus further includes means responsive to the signal when it varies from the first predetermined magnitude to the second predetermined magnitude for determining the distance of an object relative to a reference plane.

5 Claims, 4 Drawing Figures

PATENTED SEP 18 1973
3,759,614
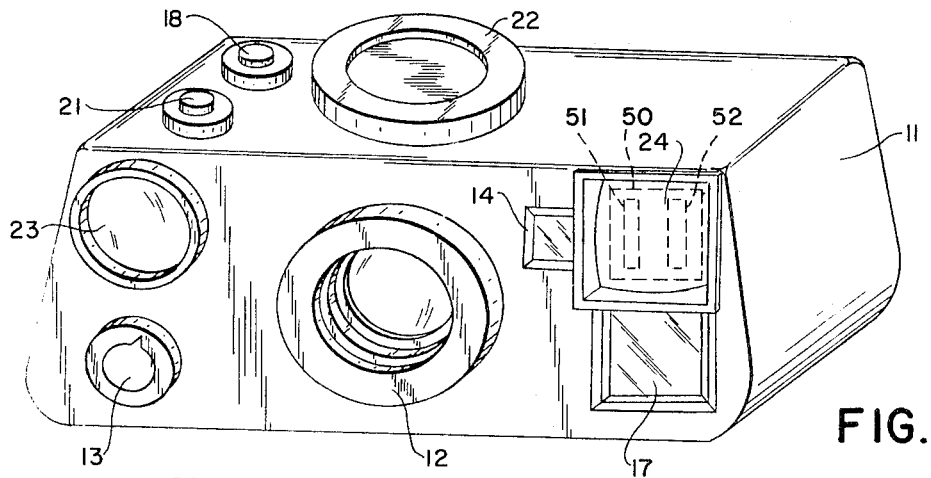
FIG. 1
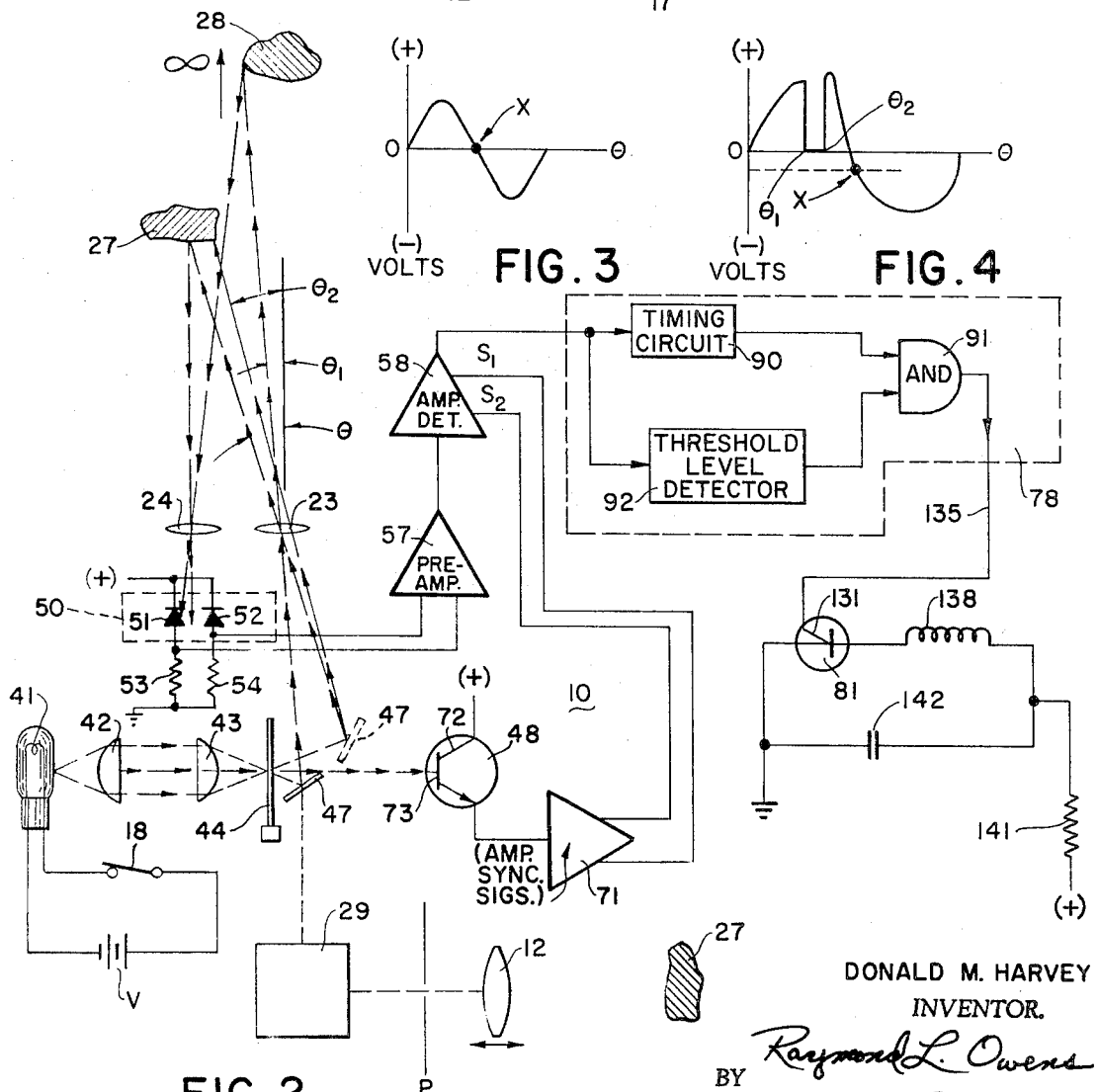
FIG. 2
FIG. 3
FIG. 4
DONALD M. HARVEY
INVENTOR.
BY Raymond L. Owens
W.H.J. Kline
ATTORNEYS

DUAL PHOTOCELL RANGE FINDER APPARATUS

CROSS REFERENCES TO RELATED APPLICATIONS

Reference is made to commonly assigned copending U.S. Pat. application, Ser. No. 38,304, now U.S. Pat. No. 3,720,148 entitled "Apparatus Having an Automatic Range Finder Mechanism," filed May 18, 1970 in the name of Donald M. Harvey, and copending U.S. Pat. application Ser. No. 56,196, entitled "Automatic Range Finder Electronic Circuitry" filed July 13, 1970, in the names of Jerome A. Frazee and Howard E. Murphy, the disclosures of which are incorporated in their entirety herein.

BACKGROUND OF THE INVENTION

The present invention relates to automatic range finder apparatus which employ spaced photosensitive devices that receive light reflected from an object and which in response to signals produced by the photosensitive devices determine the distance of the object relative to a reference plane.

Automatic range finder apparatus for photographic applications are known which employ a pair of spaced photosensitive devices having parameters which respectively vary as a function of the brightness of incident light reflected from an object whose distance relative to a reference plane is to be determined. Typically, the photosensitive devices are differentially connected in an electrical circuit which produces a signal which varies as a function of variations in the parameters of the devices. In the automatic focusing apparatus disclosed in the above-referenced copending applications, an objective lens is moved along a predetermined path until the magnitude of the parameter's two photosensitive devices are equal. At this time, movement of the objective lens is arrested and an image of the object is focused by the objective lens in a primary image plane.

While the type of range finder apparatus just referred to performs satisfactory under most conditions, there is a problem when the object is relatively narrow and a secondary object may actually reflect light and cause it to illuminate the photosensitive devices. In such a situation the photosensitive devices may produce an output signal which causes the apparatus to improperly determine the distance of the object relative to the reference plane.

BRIEF DESCRIPTION OF THE INVENTION

In the disclosed embodiment of the invention there is provided an automatic focusing apparatus which includes at least two photosensitive devices disposed in predetermined spaced relation, with respect to each other and each being adapted to receive light reflected from an object, and focusing means adapted to move an objective lens along a predetermined path. The devices each have electrical parameters, the magnitude of which vary respectively as a function of the brightness of incident light and are coupled together to produce a signal having a value which is relatively positive or negative if one of the photosensitive devices receives more incident illumination than the other. The crossover point or point of polarity reversal is defined when the incident illumination received by both devices is equal. The apparatus includes means responsive to the signal for causing the focusing means to position the objective lens along the path to focus an image of the object in a primary image plane when the signal undergoes a polarity reversal and thereafter varies to a selected level.

BRIEF DESCRIPTION OF THE DRAWINGS

The above and other objects and advantages of the present invention will become apparent to one skilled in the art from the following detailed description taken in conjunction with the attached drawings wherein like reference numerals indicate like elements and wherein:

FIG. 1 is a pictorial view of a photographic camera which includes automatic lens focusing apparatus in accordance with the present invention;

FIG. 2 is a schematic diagram partially in block form of an automatic focusing apparatus in accordance with the present invention and which is embodied in the camera shown in FIG. 1;

FIG. 3 is a curve showing a signal produced by known automatic focusing apparatus when the distance of a rather wide object is to be determined; and FIG. 4 is a curve showing the output signal of the apparatus shown in FIG. 2 in the situation wherein there is a secondary object in the scan field of the projected light beam.

DESCRIPTION OF THE PREFERRED EMBODIMENTS

A preferred embodiment of the invention is disclosed in connection with an automatic focusing apparatus for a still camera. However, it will be understood that range finder apparatus in accordance with the invention may be used in other types of cameras and other applications. Because cameras and more particularly, automatic focusing apparatus for cameras are generally well known in the art, the present disclosure will be directed in particular to elements forming part of, or cooperating more directly with apparatus in accordance with the present invention, and it will be understood that apparatus not specifically shown or described may take various forms known in the art.

In FIG. 1 there is shown a photographic camera 11 which employs automatic focusing apparatus 10 shown in FIG. 2. The camera 11 is provided with an objective lens 12 which is movable along a predetermined path and is adapted to form an image of an object to be photographed in a primary image plane and focus the image of the object in the plane when the lens 12 is correctly positioned by the focusing apparatus 10 along the path. The camera further includes a shutter adjusting dial 13, a photometric detector 14, a viewfinder 17, a focus release mechanism 18, a shutter release mechanism 21, a film winding member 22, and light projecting and receiving lens 23 and 24 respectively, which are part of the automatic focusing apparatus shown in FIG. 2. Turning now to FIG. 2, after the camera 11 is aimed at an object 27 to be photographed and the focus release mechanism 18 is depressed, a battery V is coupled to an energizes a source of light 41. Light from the source 41 is focused by lenses 42 and 43 to form a beam of light which is then modulated at a selected frequency by appropriate means such as a chopper 44. Alternatively, the source of light 41 may be modulated at the selected frequency. Light is projected by the lenses 42 and 43 to a movable mirror 47. The mirror 47 is provided with a central aperture through which modulated light passes and illuminates the base of a phototransistor 48.

A beam of light is reflected by the movable mirror 47 and projected by the lens 23 of the camera to scan a field. Towards this end, as the mirror 47 moves, it causes the beam of light to sweep through an increasingly greater angle $\theta$. The mirror 47 is positioned by a mechanism 29 through a range of positions until the mirror moves past a position wherein the brightness of the reflected light from the object 27 imaged upon a pair of photocells 51 and 52 by the lens 24 are at predetermined relative levels as later will be described which actuates circuitry causing the lens 12 to be disposed along the path to focus an image of the object 27 in the film plane P of the camera.

In the specific illustrative embodiment, the photocells are photodiodes 51 and 52 which are positioned within the camera in back of receiving lens 24. Photodiodes 51 and 52 are spaced apart a small predetermined distance, for example, in the order of two mils, and each have a parameter, namely, resistance, which varies directly as a function of the brightness of light incident thereon.

Heretofore, dual photocell automatic focusing apparatus determined the distance of the object to be photographed relative to the primary image plane of a camera at the point of crossover or polarity reversal (point X shown in FIG. 3) of a combined signal produced by the photocells. Thus, assuming that the object being scanned is one of substantial width, such as a house wall which occupies the entire scan area, the output signal will then be as shown in FIG. 3. As the brightness of the reflected light incident upon the first photodiode increases, the output gradually builds up to a maximum and then decreases to the point of polarity reversal X following which the mirror image of the signal in a negative direction is produced as the brightness of lignt incident on the opposite photodiode increases. The distance is determined at the crossover or polarity reversal point of the curve. While this gives an accurate indication in the instance of a wide area object, an accurate indication may not be possible in the instance when both a narrow subject and a secondary object are included in the scan field. More particularly, if the field through which the light beam moves includes the secondary object 28, light reflected by the secondary object 28 and projected by the lens 24 upon the photocells 51 and 52 may cause the distance to be improperly determined.

As indicated schematically in FIG. 2, as the beam of light projected by the lens 23 moves through its scan field by the action of the movable mirror 47, the light beam will first impinge upon and illuminate the secondary object 28. As reflected light traverses the surface of photodiode 51, the output signal as shown in FIG. 4 (which for our purpose can be considered to be the detector circuitry 58) first builds up to a maximum value in a positive direction. However, if the secondary object 28 is comparatively narrow with respect to its reflecting surface, a point is soon reached (at a scan angle $\theta_1$), wherein the projected light beam passes out into space with but little reflection. At this time, substantially no reflected light is received by photodiode 51 and the output signal level drops abruptly to a level which is the same as the crossover level. As the sweep continues and the beam impinges upon object 27 (at the scan angle $\theta_2$) and there will again be reflection to the surface of photodiode 51 and the signal will rise abruptly to a maximum and then decrease again to the crossover level; and substantially, pass into the negative half cycle as scanning continues and the brightness of illumination incident upon the photodiode 51 decreases and the brightness of illumination incident on the photodiode 52 increases.

As shown in FIG. 4, at the angle $\theta_1$, the signal level drops to the level at crossover which with the previously known apparatus may cause the objective lens to be improperly positioned. To overcome the foregoing problem, in accordance with the present invention, a determination of the distance of the object 27 from the camera 11 is not made until the signal (1) reaches the cross-over level and then (2) reaches a predetermined level measured from the level at crossover as shown by the point X on the curve in FIG. 4.

Returning to FIG. 2, during the scanning of the field, a voltage drop is produced across each of the load resistors 53 and 54 and is applied to preamplifier 57. (Preamplifier 57 and certain other elements of the circuitry, particularly amplifier-detector 58 and amplifier 71, may follow the general arrangement of the similar elements described in detail in the J.A. Frazee et al copending application identified above). Preamplifier 57 preferably includes a differential amplifier which measures the difference between the input voltages, which is, of course, a function of the magnitude of the resistance of the respective photodiodes 51 and 52. Since the preamplifier 57 only deals with voltage differences, voltage drops across both resistors 53 and 54 caused by ambient illumination and noise in the photocells will be substantially eliminated.

The phototransistor 48 is a junction transistor and is positioned so that the light transmitted through the aperture in mirror 47 can impinge upon its base electrode. Illumination of the phototransistor 48 is effective to increase the current flow through the reverse bias collector junction 72. The emitter electrode of phototransistor 48 is coupled to synchronous signal amplifier 71 which, in turn, produces synchronous reference signals $S_1$ and $S_2$. Amplifier 71 will preferably include suitable high pass and low pass filters eliminating most of the signal components and leaving only substantially rectangular synchronous pulses at the selected frequency.

The output of preamplifier 57 is fed to the amplifier-detector 58 as are the synchronous signals $S_1$ and $S_2$ supplied by amplifier 71. The output from amplifier-detector 58, after lowpass filtering, is a voltage which is at a zero level at the point of polarity reversal when the circuitry is balanced by the reception of equal brightness of illumination incident on the photodiodes 51 and 52 and which swings relatively + or − depending upon which one of the photodiodes 51 and 52 receives the greater radiation. This output voltage is applied over line 77 to logic circuitry 78. The logic circuitry 78 is adapted to energize an SCR 81. However, before the circuitry 78 energizes the SCR 81, two conditions must be satisfied; the first is that the level at crossover be reached and the second condition is that the level of the signal then declines to predetermined level measured from the level at crossover. To accomplish its required function, the logic circuit includes a timing circuit 90 which includes a threshold level detecting circuit energized upon the signal reaching the crossover level and produces, for a predetermined time interval, an input signal to an AND gate 91. A threshold level detector 92 also provides an input signal to the AND gate 91 but only when the output signal from the detector declines to predetermined level below the level at crossover. If both conditions are satisfied, the AND gate 91 will provide a positive voltage pulse over lead 135 to the gate electrode 131 of SCR 81. When energized the SCR 81 causes the member to be arrested at a position where it cooperates with the mechanism 29 to move the camera objective lens 12 along the predetermined path to a position wherein it focuses an image of the object 27 in the camera film plane P. A complete disclosure of suitable mechanisms which move the mirror 47 and position the objective lens are described in the above-referenced copending U.S. Pat. application, Ser. No. 38,304, and therefore, need not be described more fully here.

When potential is applied to gate electrode 131, it causes the SCR 81 to conduct and a closed circuit path is established for energization of a solenoid 138. In effect, a source of positive potential is applied through a resistor 141 to the solenoid coil. To prevent current surges through the SCR 81, a capacitor 142 is connected in parallel across the solenoid and SCR 81. The solenoid 138, when energized, positions a cam member which determines the position of the objective lens 12. Again reference is made to the copending application Ser. No. 38,304, identified above, for the detailed description of such a cam and cam positioning mechanisms. After the solenoid 138 is energized, the lens shutter release member is actuated by the camera user, and the objective lens 12 moves into contact with the stop now provided by the locked cam member and is arrested at a position wherein the image of the object 27 is focused in the film plane P of the camera 11.

The invention has been described in detail with particular reference to a preferred embodiment, thereof, but it will be understood that variations and modifications can be effected within the spirit and scope of the invention.

I claim:

1. In range finding apparatus for determining the distance of an object relative to a reference plane and including first and second photosensitive devices disposed in a predetermined spaced relation with respect to each other and each having parameters, the magnitude of which respectively vary as a function of the brightness of incident illumination from the object, the combination comprising:
   a. means coupled to the first and second photosensitive devices for producing a signal having a level which varies in accordance with changes in the magnitudes of the parameters of the first and second photosensitive devices, said signal having a first predetermined magnitude when the parameters of each of the photosensitive devices are at predetermined first relative magnitudes and a second predetermined magnitude when the parameters are at second predetermined relative magnitudes; and
   b. means responsive to a transition of said signal from the first predetermined magnitude to the second predetermined magnitude for indicating the distance of the object relative to the reference plane.

2. In range finding apparatus for determining the distance of an object relative to a reference plane and having first and second photosensitive devices disposed in a predetermined spaced relation with respect to each other and each having parameters, the magnitude of which respectively vary as a function of the brightness of incident illumination from the object, the combination comprising:
   a. means coupled to the first and second photosensitive devices for producing a signal having a level which varies in accordance with changes in the magnitudes of the parameters of the first and second photosensitive devices, said signal having a first predetermined level when the magnitude of the parameters of the photosensitive devices are equal and a second predetermined level when the parameters are at second predetermined relative magnitudes; and
   b. means responsive to said signal when the level of said signal changes from the first predetermined level to the second predetermined level for determining the distance of the objective relative to the reference plane.

3. In automatic focusing apparatus having means for forming a beam of light, means for projecting and moving the light beam through a range of positions to illuminate at least a portion of an object to be photographed, an objective lens for forming an image of the object in a primary image plane, and focusing means coupled to the objective lens and adapted to move the objective lens along a predetermined path, the combination comprising:
   a. first and second photosensitive means disposed in a predetermined spaced relation with respect to each other and each adapted to receive light reflected from the object and having parameters, the magnitude of which respectively vary as a function of the brightness of light incident thereon;
   b. means coupled to said first and second photosensitive means for producing a signal having a level which varies in accordance with changes in the magnitudes of the parameters of said first and second photosensitive means, said signal having a predetermined first level when the magnitude of the parameters are equal and a second predetermined level when the magnitude of the parameters are at predetermined relative levels; and
   c. means coupled to the focusing means and responsive to said signal when said signal changes from the first predetermined level to the second predetermined level to cause the focusing means to dispose the objective lens at a position along the path to focus an image of the object in the primary image plane.

4. In automatic focusing apparatus having means for forming a beam of light, means for projecting and moving the beam of light through a range of positions to illuminate at least a portion of an object to be photographed, an objective lens for forming an image of the object in a primary image plane, and focusing means coupled to the objective lens and adapted to move the objective lens along a predetermined path, the combination comprising:
   a. a first photosensitive device adapted to receive light reflected from the object and having a parameter which varies as a function of the brightness of incident illumination;
   b. a second photosensitive device adapted to receive light reflected from the object and having a parameter which varies as a function of the brightness of incident illumination;

c. means coupled to said first and second photosensitive devices and responsive to variations in the parameters thereof to produce a signal having a level which is relatively positive when said first photosensitive device receives greater brightness of illumination than said second photosensitive device and relatively negative when said second photosensitive device receives greater brightness of illumination than said first photosensitive device and which undergoes a polarity reversal when a condition of equal brightness of incident light on each of said photosensitive devices is passed; and d. means coupled to the focusing means and responsive to said signal after the magnitude of said signal undergoes polarity reversal and changes to a predetermined level measured from its level at polarity reversal to cause the focusing means to dispose the objective lens at a position along the path to focus an image of the object in the primary image plane.

5. In automatic focusing apparatus having means for forming a beam of light, means for projecting and moving the light beam through a range of positions to illuminate at least a portion of an object to be photographed, an objective lens for forming an image of the object in a primary image plane, and focusing means coupled to the objective lens and adapted to move the objective lens along a predetermined path, the combination comprising:

a. first and second photosensitive means disposed in a predetermined spaced relation with respect to each other and each adapted to receive light reflected from the object and having parameters, the magnitude of which respectively vary as a function of the brightness of light incident thereon;

b. means coupled to said first and second photosensitive means for producing a signal having a level which varies in accordance with changes in the magnitudes of the parameters of said first and second photosensitive means, said signal having a predetermined first level when the magnitude of the parameters are equal and a second predetermined level when the magnitude of the parameters are at predetermined relative levels;

c. means coupled to the focusing means for simultaneously moving the objective lens as the beam of light moves through the range of positions; and d. means coupled to the focusing means and responsive to said signal when said signal changes from the first predetermined level to the second predetermined level to cause the focusing means to arrest the objective lens at a position along the path to focus an image of the object in the primary image plane.

* * * * *

PO-1050
(5/69)

UNITED STATES PATENT OFFICE
CERTIFICATE OF CORRECTION

Patent No. 3,759,614       Dated September 18, 1973

Inventor(s)  Donald M. Harvey

It is certified that error appears in the above-identified patent and that said Letters Patent are hereby corrected as shown below:

Column 2, line 58    Delete "an" and substitute therefor --and--

Column 6, line 17    Delete "objective" and substitute therefor --object--

Signed and sealed this 19th day of February 1974.

(SEAL)
Attest:

EDWARD M. FLETCHER, JR.
Attesting Officer

C. MARSHALL DANN
Commissioner of Patents